Figure 1:
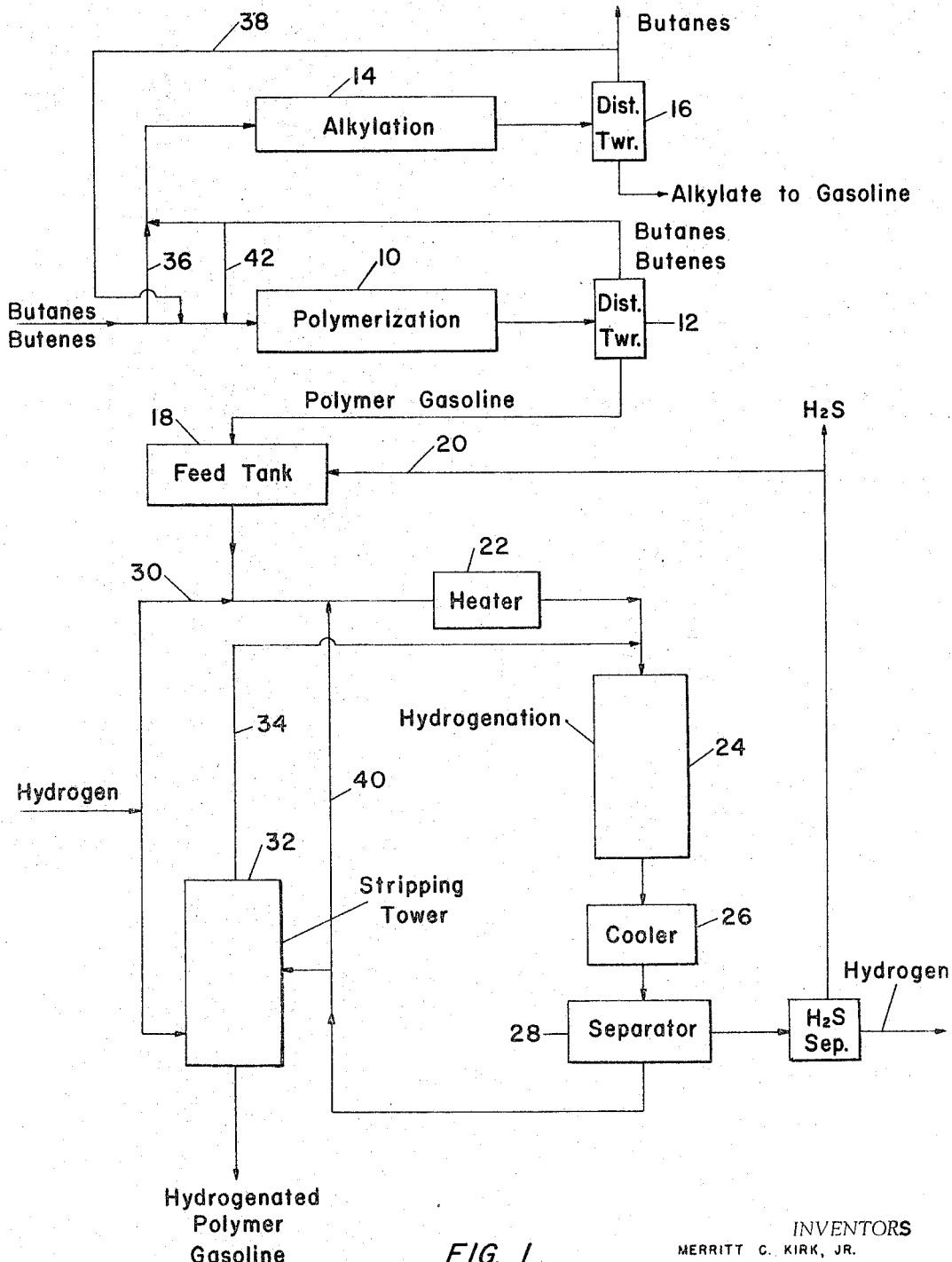

INVENTORS
MERRITT C. KIRK, JR.
ALBERT T. OLENZAK
HENRY E. REIF
WILLIAM D. THOMAS
BY Donald R. Johnson
ATTORNEY

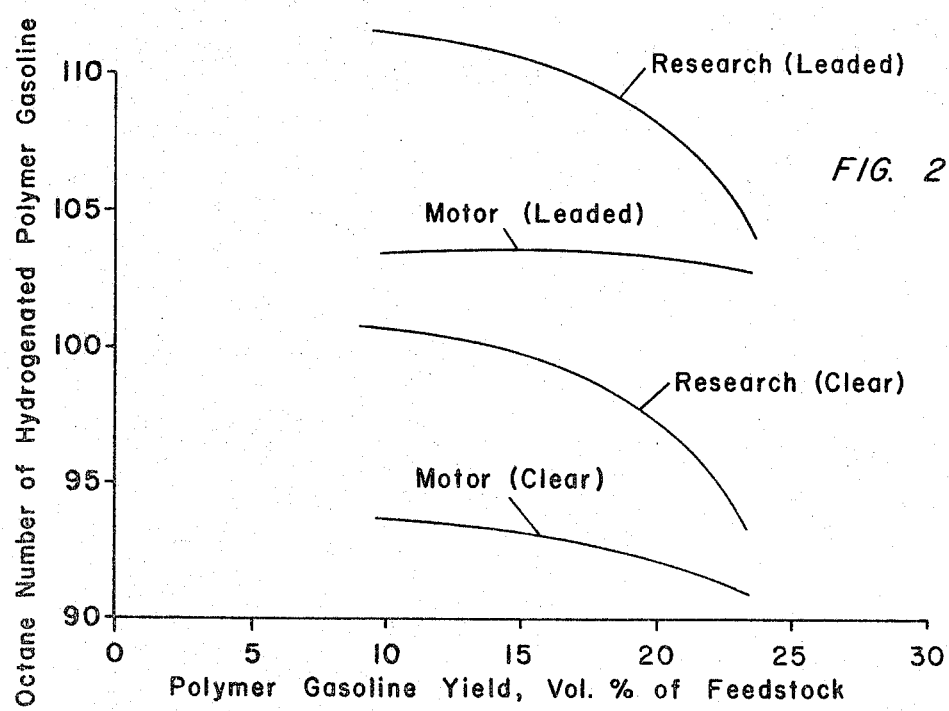
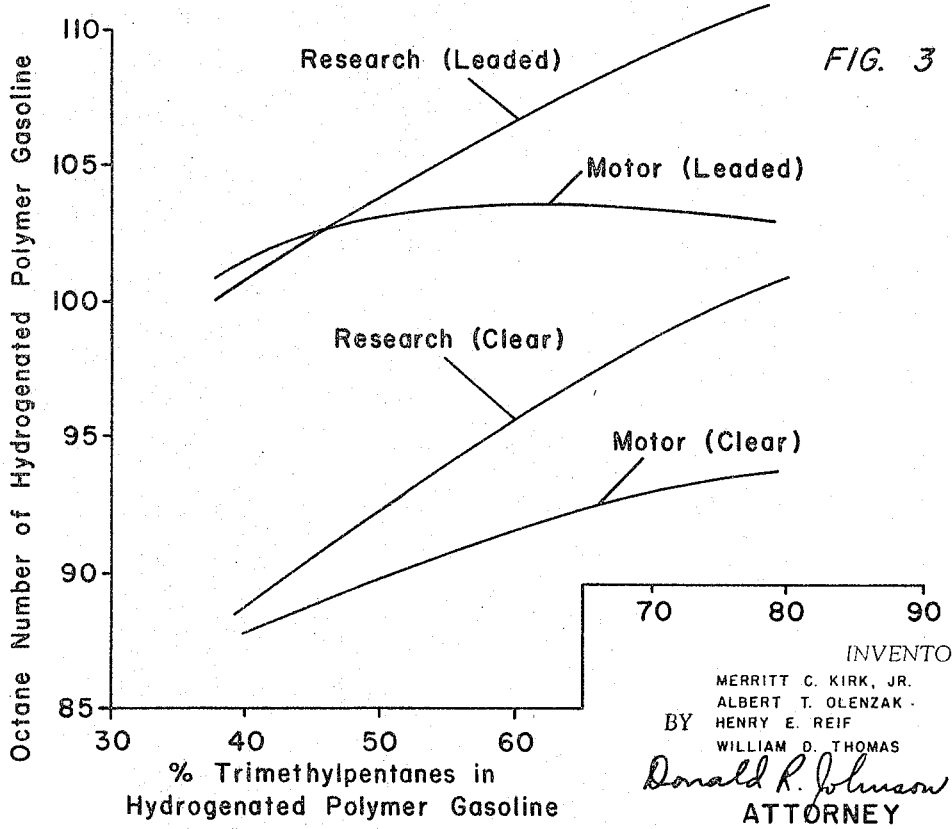

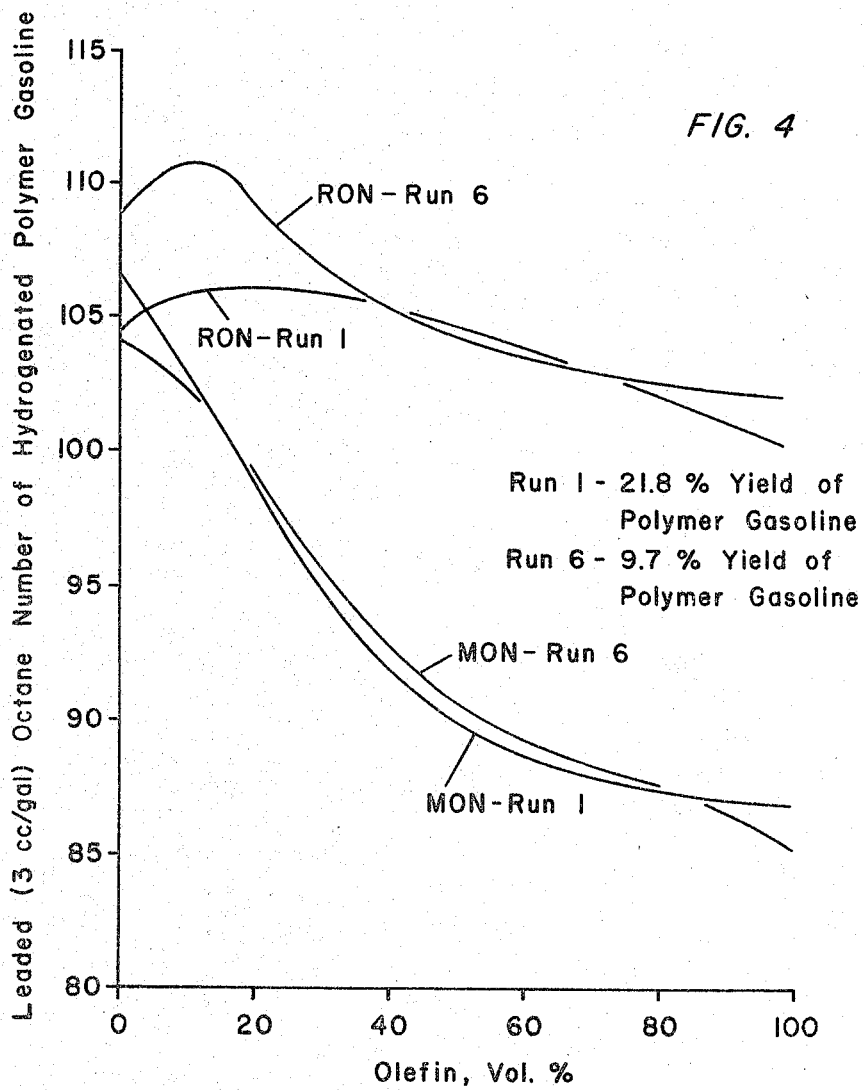

United States Patent Office 3,309,421
Patented Mar. 14, 1967

3,309,421
PRODUCTION OF HYDROGENATED POLYMER
GASOLINE
Merritt C. Kirk, Jr., Claymont, Del., Albert T. Olenzak, Media, and Henry E. Reif, Bryn Mawr, Pa., and William D. Thomas, Maumee, Ohio, assignors to Sun Oil Company, Philadelphia, Pa., a corporation of New Jersey
Filed Dec. 23, 1965, Ser. No. 515,966
11 Claims. (Cl. 260—683.15)

This application is a continuation of our copending application filed Sept. 30, 1963 and bearing Ser. No. 312,521.

This invention relates to polymerization of butenes and hydrogenation of the resulting polymer gasoline, and more particularly to the obtaining of optimum combinations of leaded research octane number and leaded motor octane number by such polymerization and hydrogenation.

The manufacture of polymer gasoline from butenes is well known in the art, and in the prior art, polymer gasoline has been hydrogenated to obtain components for use in high octane gasoline. However, the art failed to obtain optimum combinations of leaded research octane number and leaded motor octane number in such operations. This failure has apparently been due to a lack of recognition of the essential combination of conditions and other factors relating to both the polymerization of butenes to produce polymer gasoline, and the hydrogenation of the latter to form the hydrogenated polymer gasoline.

According to the present invention, the polymerization and hydrogenation are so carried out in combination, in a manner not previously employed, as to obtain a much superior product to that obtained in the prior art.

In the polymerization step according to the invention, it is essential that the yield of polymer gasoline be in the range from about 25 to 50 volume percent based on olefins in the fresh feed to the polymerization. Typically, this corresponds to a yield of polymer gasoline in the range from 10 to 20 volume percent of total fresh $C_4$ feed.

Preferably, in the polymerization, there is 5 to 20 volume percent conversion of the butene-2 in the feed, 40 to 90 volume percent conversion of the butene-1 in the feed, and 60 to 90 volume percent conversion of the isobutylene in the feed.

Since butene-2 gives high quality alkylate in alkylation, but gives lesser quality polymerization product in polymerization than does isobutylene, limitation of the polymerization to maintain relatively low conversion of butene-2, and passage of the unconverted butene-2 to alkylation, are particularly beneficial.

Preferably, the polymer gasoline which is produced in the polymerization contains at least 50 volume percent, preferably 50 to 95 volume percent, typically 50 to 80 volume percent, of trimethylpentenes. This relatively high yield of trimethylpentenes reflects the relatively high conversion of isobutylene in the polymerization.

Preferably, the polymerization is carried out using a conventional calcined phosphoric acid on kieselguhr catalyst, at a reactor outlet temperature in the range from 280 to 400° F., more preferably 280 to 380° F., and a reactor outlet pressure in the range from 400 to 600 p.s.i.g., and at a liquid hourly space velocity in the range from 0.6 to 1.2 gallons of feed per pound of catalyst per hour.

Other known processes for polymerization of butenes to polymer gasoline may be employed, provided they give the yield of polymer gasoline as previously specified.

In the hydrogenation step according to the invention, it is essential that the olefin content of the polymer gasoline be reduced to 30 volume percent or less, and in some instances to 20 volume percent or less. Optimum leaded motor octane, with excellent leaded research octane, is obtained at 0 to 10 volume percent olefins. Optimum leaded research octane, with highly satisfactory leaded motor octane, is obtained at 5 to 15 volume percent olefins.

Any of the well-known hydrogenation catalysts can be employed, such as cobalt, molybdenum, platinum, nickel, vanadium, tungsten, etc., oxides and sulfides thereof, etc. A preferred catalyst is a sulfided mixture of cobalt and molybdenum oxides. Suitable catalyst supports, as well known in the art, are preferably employed.

The temperature of the hydrogenation is preferably in the range from 425 to 650° F., and the pressure in the range from 400 to 1000 p.s.i.g. The hydrogenation may be performed by passing the feed and hydrogen through a bed of catalyst at a space rate preferably in the range from 1 to 5 volumes of fresh feed per volume of catalyst bed per hour. The feed may be passed through a plurality of beds in series at a space velocity of 5 to 20 v./v./hr. in each bed, with overall space velocity of 1 to 5 v./v./hr. Preferably, the hydrogen rate is in the range from 1500 to 3000 standard cubic feet per barrel of feed.

The exothermic heat of the hydrogenation tends to raise the temperature in the hydrogenation zone. Overheating can be avoided by providing external cooling, or by adding a diluent liquid, which may for example be recycled hydrogenated polymer gasoline. Diluent may be added to the feed, and/or between catalyst beds in series, to provide cooling of the intermediate product before passage into the next bed.

The olefin content of the hydrogenated product can be controlled by regulation of the hydrogenation conditions, in a manner which will be apparent to the person skilled in the art in the light of the present specification. The olefin content of the hydrogenated product generally decreases with increasing hydrogenation temperature and pressure and hydrogen rate, and decreasing space velocity. The olefin content also decreases with increasing catalyst activity. Sulfided cobalt and molybdenum oxides constitute a catalyst of good activity. Sulfiding is essential for optimum activity with this catalyst.

Sulfiding of the catalyst prior to the hydrogenation may be carried out by passing hydrogen containing 3 to 15 mole percent of $H_2S$ over the catalyst at a temperature for example in the range from 500 to 650° F., and preferably about 600° F. It is also necessary, in order to maintain optimum activity of the catalyst, to maintain a sufficient $H_2S$ content in the gases contacted with the catalyst during the hydrogenation. The latter may be accomplished for example by saturating the polymer gasoline feed with $H_2S$ at 5 to 10 p.s.i.g. and ambient temperature to obtain 0.1 to 1.0 mol percent $H_2S$ in total reactor feed, preferably 0.2 to 0.5 mol percent. Other known means of providing sufficient sulfur concentration during the hydrogenation can be employed.

The polymer gasoline which is obtained in the polymerization, and subsequently hydrogenated according to the invention, preferably has Engler distillation end point of 400° F. or less. Polymer gasolines having higher endpoints tend to deactivate hydrogenation catalysts such as sulfided cobalt-molybdenum oxides more rapidly than those having endpoints of 400° F. or less.

The invention will be further described with reference to the attached drawings, wherein FIGURE 1 is a schematic flowsheet of the process according to the invention, and FIGURES 2 and 4 are plots of octane number of hydrogenated polymer gasoline against polymer gasoline yield in FIGURE 2, against percent trimethylpentanes in hydrogenated polymer gasoline in FIGURE 3, and against percent olefins in hydrogenated polymer gasoline in FIGURE 4.

In FIGURE 1, a $C_4$ fraction is introduced into polymerization zone 10 wherein it is subjected to polymerization. The butenes are dimerized to various octenes. By control of the polymerization conditions, and of the resulting yield of polymer gasoline, a product having a relatively high trimethylpentene content is obtained. In distillation zone 12, unreacted butanes and butenes are taken overhead and passed to alkylation zone 14, wherein they are subjected to conventional sulfuric acid or HF alkylation catalyst to produce alkylate. The product is distilled in tower 16 to obtain unreacted butanes as overhead, and alkylate as bottoms.

The residue from tower 12 is polymer gasoline containing octenes and other products. In feed tank 18, the polymer gasoline is contacted with an $H_2S$-containing gas introduced through line 20. The $H_2S$ is for the purpose of sulfiding the hydrogenation catalyst with which the polymer gasoline is later contacted. The polymer gasoline containing dissolved $H_2S$ is admixed with hydrogen and passed through heater 22 into hydrogenation reactor 24 which is packed with a conventional hydrogenation catalyst comprising cobalt and molybdenum oxides on alumina. The product passes through cooler 26 into separator 28. Gas from separator 28 goes to a conventional $H_2S$ separation unit, such as an ethanolamine scrubbing unit. Separated $H_2S$ is in part recycled through line 20 to feed tank 18, and in part used or disposed of in conventional fashion. Separated hydrogen may be recycled to line 30 or otherwise used or disposed of.

Liquid from separator 28 passes to tower 32 in which it is countercurrently contacted with hydrogen to strip out light ends from the liquid. The overhead is introduced through line 34 into the heated feed to the hydrogenation. The residue is hydrogenated polymer gasoline containing a high trimethylpentane content and a low olefin content, with optimum combination of leaded research and motor octane numbers.

A portion of the hydrogenated polymer product removed from separator 28 is passed through line 40 into admixture with the polymer gasoline feed to the hydrogenation, and serves to reduce the temperature rise which is undergone by the polymer gasoline during the hydrogenation, and thereby to avoid excessively high temperatures.

In one embodiment, a portion of the $C_4$ feedstock is passed through line 36 directly into alkylation reactor 14, without going through polymerization reactor 10. In typical operation of this sort, as performed in the prior art, the yield in the polymerization has been relatively high, and consequently a desired amount of polymer gasoline has been obtained with a relatively small amount of polymerization feed, the remainder of the $C_4$ feed having been bypassed directly to alkylation.

According to the present invention, a relatively large amount of $C_4$ feed is charged to polymerization, and the amount bypassed directly to alkylation is therefore relatively small. The yield of polymer gasoline based on feed is relatively small, but the desired amount of polymer gasoline is obtained as a result of the larger amount of polymerization feed. The alkylation feed and product amounts are not reduced, since the larger amount of $C_4$ passing from the polymerization reactor to the alkylation reactor makes up for the reduced amount of $C_4$ feed bypassed directly to alkylation. The alkylate quality obtained with the larger amount of polymerization effluent and lesser amount of $C_4$ bypass according to the invention is equal to or better than that obtained with the conventional relatively small amount of polymerization effluent and relatively large amount of $C_4$ bypass.

In typical operation according to the invention, about 25% of the $C_4$ feed is passed directly to alkylation, and about 75% is passed to polymerization. Preferably, 15 to 35% of the $C_4$ feed is passed directly to alkylation, and the remainder is passed to polymerization.

In one embodiment, butane overhead from tower 16 is recycled through line 38 to polymerization zone 10 in order to increase the space velocity obtained with a given rate of fresh $C_4$ feed, and consequently to obtain the desired relatively low conversion of butenes in polymerization reactor 10. In another embodiment, $C_4$ overhead from tower 12 is recycled through line 42 to polymerization zone 10 in order to obtain such increase in space velocity.

The following examples illustrate the invention:

EXAMPLE 1

A $C_4$ feedstock having the following composition is polymerized over calcined phosphoric acid on kieselguhr:

| | Liq. percent |
|---|---|
| Propane | 0.7 |
| Isobutane | 40.0 |
| n-Butane | 18.9 |
| Isobutylene | 13.7 |
| Butene-1 | 7.8 |
| Butene-2 (cis) | 6.6 |
| Butene-2 (trans) | 10.4 |
| Pentanes and higher | 1.9 |
| | 100.0 |

The reactor outlet temperature is 294–302° F., the reactor outlet pressure 475 p.s.i.g., and the space velocity 0.94–0.99 gallon per pound of catalyst per hour. The yield of polymer gasoline is 15.8 volume percent based on fresh feed.

The polymer gasoline has the following properties:

| | | |
|---|---|---|
| API gravity | | 63.8 |
| Engler: | | |
| IBP | ° F. | 98 |
| 10% | ° F. | 177 |
| 50% | ° F. | 230 |
| 90% | ° F. | 254 |
| EP (98%) | ° F. | 367 |
| Octanes: | | |
| Research (clear) | | 100.2 |
| Research (3 cc. TEL) | | 102.6 |
| Motor (clear) | | 84.1 |
| Motor (3 cc. TEL) | | 86.6 |
| Bromine No. | | 131.2 |
| Vol. percent olefins | | 94.8 |
| Sulfur content | p.p.m. | 313 |

Composition, vol. percent:

| | |
|---|---|
| Isobutane | 0.6 |
| n-Butane | 2.4 |
| Butenes | 1.5 |
| Isopentane | 4.0 |
| n-Pentane | 0.2 |
| Pentenes | 1.2 |
| Hexenes and higher | 90.1 |
| | 100.0 |

The analytical hydrogenated polymer gasoline has the following composition:

| | Wt. percent |
|---|---|
| Butanes | 0.4 |
| Pentanes | 1.7 |
| Hexanes | 3.1 |
| Heptanes | 9.1 |
| Octanes | 82.6 |
| Others | 3.1 |
| | 100.0 |

The heptanes consist of: methylhexanes, 0.7 wt. percent; dimethylpentanes, 7.3 wt. percent; and trimethylbutane, 1.1 wt. percent. The octanes consist of: dimethylhexanes, 2.3 wt. percent; and trimethylpentanes, 82.3%.

The isomer distribution of the trimethylpentanes is: 2,2,3, 14.3%; 2,2,4, 24.4%; 2,3,3, 8.8% and 2,3,4, 32.8%.

The polymer gasoline is hydrogenated over sulfided cobalt and molybdenum oxides at a temperature of 445 to 590° F., pressure of 450 p.s.i.g. and liquid hourly space velocity of 3.15 volumes of fresh feed per volume of catalyst bed per hour, with 2700 standard cubic feet of hydrogen per barrel of fresh feed, to give a product having 8.0 volume percent olefins and the following octane numbers:

| | |
|---|---|
| Research (clear) | 100.8 |
| Research (3 cc. TEL) | 111.2 |
| Motor (clear) | 93.4 |
| Motor (3 cc. TEL) | 102.8 |

*Comparison example*

A $C_4$ feedstock equivalent to that in Example 1 is polymerized over calcined phosphoric acid on kieselguhr with reactor outlet temperature of 360–390° F., reactor outlet pressure of 500 p.s.i.g. and space velocity of 0.35 gallon per pound of catalyst per hour. The yield of polymer gasoline is 22.2 volume percent based on fresh feed.

The polymer gasoline has the following properties:

| | | |
|---|---|---|
| API gravity | | 61.8 |
| Engler: | | |
| IBP | ° F | 115 |
| 10% | ° F | 192 |
| 50% | ° F | 245 |
| 90% | ° F | 363 |
| EP (96%) | ° F | 425 |
| Octanes: | | |
| Research (clear) | | 98.3 |
| Research (3 cc. TEL) | | 101.7 |
| Motor (clear) | | 82.7 |
| Motor (3 cc. TEL) | | 86.3 |
| Bromine No. | | 132.1 |
| Vol. percent olefins | | 95.7 |
| Sulfur content | p.p.m | 105 |

Composition vol. percent:

| | |
|---|---|
| Isobutane | 0.6 |
| n-butane | 1.9 |
| Butenes | 0.8 |
| Isopentane | 2.3 |
| Pentenes | 1.0 |
| Hexenes and higher | 93.4 |

The analytically hydrogenated polymer gasoline has the following composition:

| | Wt. percent |
|---|---|
| Butanes | 0.9 |
| Pentanes | 3.5 |
| Hexanes | 5.5 |
| Heptanes | 10.8 |
| Octanes | 69.9 |
| Nonanes | 5.5 |
| Other | 3.9 |
| | 100.0 |

The heptanes consist of: methylhexanes 1.9 wt. percent; dimethylpentanes, 8.6%; and trimethylbutane, 0.3%. The octanes consist of: methylheptanes 5.2%; dimethylhexanes, 27.0%; and trimethylpentanes, 33.7% (2,2,3, 6.1%; 2,2,4, 6.4%; 2,3,3, 5.8% and 2,3,4, 19.4%).

The polymer gasoline is hydrogenated over sulfided cobalt and molybdenum oxides at temperature of 650° F., pressure of 500 p.s.i.g. and liquid hourly space velocity of 2.2 volumes of fresh feed per volume of catalyst bed per hour, with 2450 standard cubic feet of hydrogen per barrel of fresh feed, to give a product having 5.4 volume percent olefins and the following octane numbers:

| | |
|---|---|
| Research (clear) | 88.0 |
| Research (3 cc. TEL) | 100.0 |
| Motor (clear) | 87.2 |
| Motor (3 cc. TEL) | 100.6 |

The product obtained in this example is much inferior in research octane, and inferior also in motor octane, to that obtained in Example 1, because of the higher polymer gasoline yield in this example (22.2% compared with 15.8% in Example 1), and the resulting differences in polymer gasoline composition. For example, the trimethylpentane content in this example is 33.7% as compared with 82.3% in Example 1.

The above examples illustrate the important effect of the yield of polymer gasoline obtained in the polymerization upon the octane number of the hydrogenated polymer gasoline. The following example and FIGURE 2 in the drawings provide additional data relating to this effect.

EXAMPLE 2

Various runs were made in which $C_4$ olefins were polymerized to give different yields to polymer gasoline, and the polymer gasoline was subsequently hydrogenated under conditions similar to those previously disclosed. The following table shows the yield of polymer gasoline, the weight percent of trimethyl pentanes in the analytically hydrogenated polymer gasoline, the percent olefins in the hydrogenated product and the octane numbers of the hydrogenated product in each of the runs:

| Run No. | 1 | 2 | 3 | 4 | 5 | 6 |
|---|---|---|---|---|---|---|
| Yield percent | 21.8 | 21.4 | 22.2 | 24.0 | 15.8 | 9.7 |
| Percent TMP | 64.5 | 53.3 | 33.7 | 54.8 | 80.3 | 69.3 |
| Percent olefins | 4.0 | 7.2 | 5.4 | 2.9 | 8.0 | 7.2 |
| Octane: | | | | | | |
| F-1 clear | 94.3 | 94.5 | 88.0 | 93.2 | 100.8 | 98.6 |
| F-1 plus 3 cc. TEL | 105.1 | 105.2 | 100.0 | 104.0 | 111.2 | 110.8 |
| F-2 clear | 91.3 | 91.2 | 87.2 | 91.0 | 93.4 | 92.8 |
| F-2 plus 3 cc. TEL | 103.6 | 103.3 | 100.6 | 103.6 | 102.8 | 103.2 |

FIGURE 2 represents graphically data given in Example 2. FIGURE 2 shows that the leaded research octane decreases markedly as the polymer gasoline yield is increased from 10 to 25 volume percent of the total fresh feed. The leaded motor octane undergoes little change in the same range. In order to obtain optimum combination of yield, research and motor octanes, a polymer gasoline yield in the range from 10 to 20 volume percent is obtained.

Control of the yield of polymer gasoline is readily obtained by the person skilled in the art in the light of the present specification. Higher temperatures and pressures and lower space rates increase the yield, and lower temperatures and pressures and higher space rates decrease the yield. Changing the yield has various effects on the composition of the polymer gasoline. One of the important effects is the effect on the trimethylpentene content of the polymer gasoline. Higher yields of polymer gasoline generally result in lower trimethylpentene contents, and the reverse is also true. The effect of trimethylpentene content in the polymer gasoline, and of trimethylpentane and trimethylpentene content in the hydrogenated polymer gasoline, is shown in FIGURE 3.

FIGURE 3, which is also taken from data given in Example 2, shows the effect of the amount of trimethyl pentanes in the analytically hydrogenated polymer gasoline upon the research and motor octanes. The leaded research octane increases with increasing trimethylpentanes, and is still increasing at 80% trimethylpentanes. The leaded motor octane on the other hand goes through a maximum at about 50 to 70% trimethylpentanes. In order to obtain optimum combination of leaded research and motor octane without excessive sensitivity (difference between research and motor octanes), the amount of trimethylpentanes should be in the range from 50 to 80%. Preferably, the amount is at least 65%.

FIGURE 4 shows the necessity, in order to obtain the benefits of the invention, of (1) hydrogenating a polymer obtained in polymerization which produced a relatively low yield of polymer gasoline, and (2) hydrogenating to obtain a product having olefin content of 30 volume percent or less.

The figure gives data on leaded research and motor octanes of polymer obtained in Run 6 in the preceding Example 2, and of polymer obtained in Run 1 in Example 2, hydrogenated to give varying olefin contents ranging from 0 (complete saturation) to 100 (no hydrogenation) percent. Optimum leaded research octanes are obtained only when hydrogenating the Run 6 polymer, which was obtained in 9.7% yield in the polymerization, and then only when the product olefin content is 20 volume percent or less. Optimum leaded research octane is obtained at product olefin content of 5 to 15 volume percent, and optimum leaded motor octane is obtained at 0 to 15 volume percent olefin, with continual improvement upon lowering of the olefin content all the way to zero percent.

In the hydrogenation according to the invention, the temperature is preferably less than 600° F., in order to minimize decomposition reactions. Hydrogenated product yields of 100 to 105% based on hydrogenation feed are typically obtained at temperatures below 600° F., showing a minimum of decomposition.

As shown previously, with a polymerization feed having a typical butene-2 content, the yield of polymer gasoline obtained in the polymerization should be within a stated range. In cases where the butene-2 content of the polymerization feed is relatively low, a relatively high yield of polymer gasoline can be obtained while still obtaining a relatively low conversion of butene-2 and a relatively high yield of the desired trimethylpentenes. Preferably, the yield of polymer gasoline is in the range from 50 to 100 volume percent based on olefins other than butene-2 in the polymerization feed.

The following table shows a typical comparison of compositions of fresh feed to the polymerization and unreacted effluent gases from the polymerization reactor (line 42 in FIGURE 1):

|  | Feed, volume percent | Unreacted, volume percent |
|---|---|---|
| Propane | 0.7 | 0.6 |
| Isobutane | 40.0 | 56.3 |
| n-Butane | 18.9 | 29.1 |
| Isobutylene | 13.7 | 1.9 |
| Butene-1 | 7.8 | 1.1 |
| Butene-2 (cis) | 6.6 | 3.3 |
| Butene-2 (trans) | 10.4 | 7.0 |
| Pentanes and higher | 1.9 | 0.7 |
|  | 100.0 | 100.0 |

In the process according to the invention, the isobutylene and butene-1 contents of the unreacted gases are each preferably less than 25%, typically 5 to 20%, of the isobutylene and butene-1 contents respectively of the feed; and the butene-2- content of the unreacted gases is preferably at least 50%, typically 55 to 85%, of the butene-2 content of the feed.

The invention claimed is:

1. A process for producing an improved polymer feedstock for a hydrogenation unit to produce improved gasoline components which comprises polymerizing $C_4$ feedstock containing butenes and butanes at a temperature in the range from 280 to 400° F., at a pressure of about 400 to 600 p.s.i.g. and a liquid hourly space velocity in the range from 0.6 to 1.2 gallons of fresh feed per pound of catalyst per hour with the further provision that said conditions are selected to obtain 5 to 20 volume percent conversion of any butene-2 in the feed, 40 to 90 volume percent conversion of any butene-1 in the feed, and 60 to 90 volume percent conversion of any isobutylene in the feed.

2. A process according to claim 1 wherein said polymerization is carried out at a temperature in the range from 280 to 380° F. and a liquid hourly space velocity in the range from 0.6 to 1.2 gallons of fresh feed per pound of catalyst per hour.

3. A process according to claim 1 wherein the polymerization catalyst is calcined phosphoric acid on kieselguhr.

4. A process according to claim 3 wherein the polymer product so formed contains at least 50 weight percent trimethylpentenes.

5. A process according to claim 3 wherein the endpoint of the polymer product so formed is not substantially higher than 400° F.

6. A process according to claim 3 wherein the polymer product so formed contains at least 50 weight percent trimethylpentenes.

7. A process according to claim 3 wherein the endpoint of the polymer product so formed is not substantially higher than 400° F.

8. A process for producing an improved polymer feed stream which will yield improved gasoline components having leaded (3 cc. tetraethyl lead per gallon) research octane of at least 105 and leaded (3 cc. tetraethyl lead per gallon) motor octane of at least 100 when said polymer gasoline is hydrogenated to reduce the olefin content thereof to within the range from 0 to 30 percent which comprises polymerizing a $C_4$ feedstock containing butenes and butanes at a temperature in the range from 280 to 400° F., at a pressure of about 400 to 600 p.s.i.g. and a liquid hourly space velocity in the range from 0.6 to 1.2 gallons of fresh feed per pound of catalyst per hour with the further provision that said conditions are selected to obtain 50 to 100 volume percent yield of polymer gasoline based on olefins, exclusive of butene-2, in the feedstock and a total of 25 to 50 volume percent yield of polymer gasoline based on total olefins in the feedstock.

9. A process according to claim 8 said polymerization is carried out at a temperature in the range from 280 to 380° F. and a liquid hourly space velocity in the range from 0.6 to 1.2 gallons of fresh feed per pound of catalyst per hour.

10. A process according to claim 8 wherein said hydrogenation is carried over presulfided cobalt-molybdenum catalyst at a temperature in the range from 425 to 650° F., pressure in the range from 400 to 1000 p.s.i.g. and liquid hourly space velocity in the range from 1 to 5 volumes per volume of catalyst bed per hour.

11. A process according to claim 8 wherein the hydrogenation is carried out with a presulfided cobalt-molybdenum catalyst, and the feed to the hydrogenation contains 0.1 to 1.0 mole percent of $H_2S$ based on total feed.

References Cited by the Examiner

UNITED STATES PATENTS

| 2,678,263 | 5/1954 | Glazier | 208—17 |
| 2,775,638 | 12/1956 | Milliken et al. | 260—683.9 |
| 3,100,808 | 8/1963 | Kyer | 208—18 |
| 3,125,503 | 3/1964 | Kerr et al. | 260—683.15 |
| 3,126,420 | 3/1964 | Bloch et al. | 260—683.15 |

DELBERT E. GANTZ, *Primary Examiner.*

S. P. JONES, *Assistant Examiner.*